H. B. RAMSEY.
Improvement in Brick-Machines.

No. 133,175. Patented Nov. 19, 1872.

Witnesses:
Chas. Nida
C. Sedgwick

Inventor:
H. B. Ramsey
Munn & Co.
Attorneys.

UNITED STATES PATENT OFFICE.

HENRY B. RAMSEY, OF ROCKVILLE, INDIANA, ASSIGNOR TO A. K. STARK, OF SAME PLACE.

IMPROVEMENT IN BRICK-MACHINES.

Specification forming part of Letters Patent No. 133,175, dated November 19, 1872.

*To all whom it may concern:*

Figure 1:
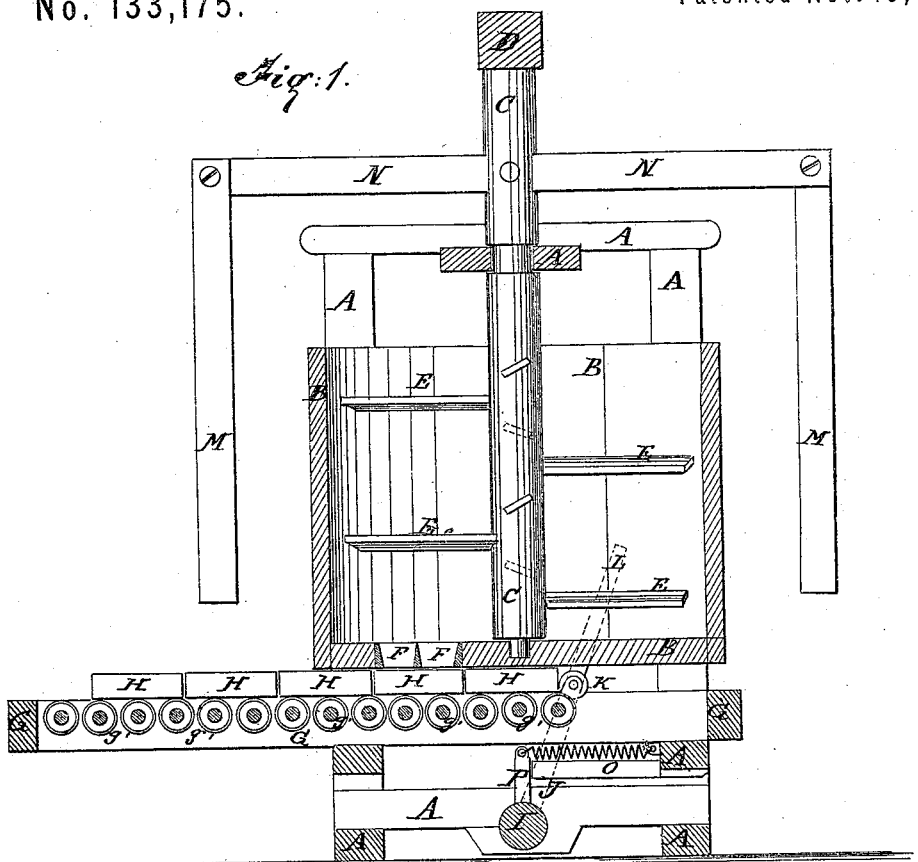
Figure 2:
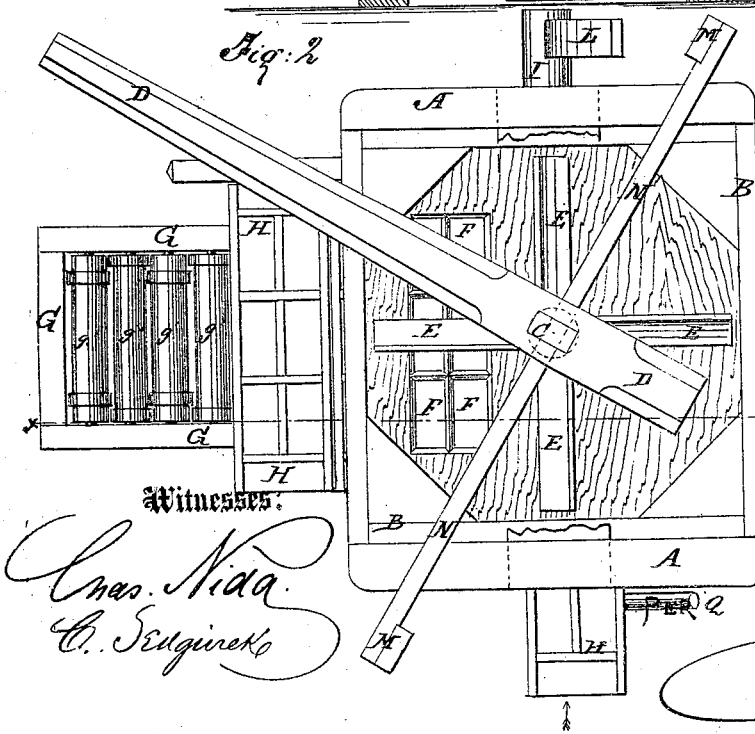

Be it known that I, HENRY B. RAMSEY, of Rockville, in the county of Parke and State of Indiana, have invented a new and useful Improvement in Brick-Machines, of which the following is a specification:

In the accompanying drawing, Figure 1 is a detail vertical section of my improved machine taken through the line $x\ x$, Fig. 2; Fig. 2 is a top view of the same.

Similar letters of reference indicate corresponding parts.

My invention relates to the class of brick-machines adapted for a simultaneous and continuous working and discharge of the clay, and filling and delivery of the molds; the object in view being to produce a machine simple in construction, inexpensive, convenient in use, and reliable in operation; and it consists in the construction and combination of various parts of the machine, as hereinafter more fully described.

A is the frame of the machine, to which the tank B is attached. C is a vertical shaft, the lower end of which, or a journal formed upon said lower end, revolves in a socket or step at the center of the bottom of the tank B. The upper part of the shaft C revolves in bearings in a stay attached to the upper part of the frame A, and to its upper end is attached the sweep or lever D, by means of which the power is applied. To the shaft C, within the tank B and at different heights, are attached radial knives or arms E, by which the clay is worked into proper condition for entering the molds. The lowest knife E revolves near the bottom of the tank B, and is so formed as to force the clay through the opening F in the forward part of the said bottom. The openings F are made of the size of a brick, and their sides are made inclined or flaring, so that the clay in entering the molds may strike the centers of said molds before it strikes their sides. G is a frame secured to the frame A below the tank B to support the molds H, and which should be so arranged that the tops of the molds may be close to the bottom of the tank B. The frame G should be adjustable, so that it may be raised and lowered according to the size of the molds to be used. To the side bars of the frame G are pivoted rollers $g'$, upon which the molds H rest while being filled, and upon which they are carried out from beneath the tank B. The molds H are inserted beneath the middle part of the tank B from one side, as indicated in Fig. 2. I is a shaft pivoted to the lower part of the framework A, and to which are attached arms J, which project upward at the rear of the place where the molds are first inserted, so that when the shaft I is rocked they may press against the rear side of the mold last inserted and push it forward beneath the openings F into position to receive the clay. The friction between the arms J and the molds H is diminished by friction rollers or wheels K attached to said arms J. To one end of the shaft I is attached an upwardly-projecting arm, L, against which strike downwardly-projecting arms M, the upper ends of which are attached to the outer ends of the cross-bar N attached to the upper part of the shaft C, so that the molds may be moved forward twice at each revolution of the shaft C. The friction between the arms L and M may be diminished by rollers or wheels pivoted to the lower ends of the said arms M. The shaft I is drawn back to its place when the arm L is released from the arm M by a coiled or equivalent spring, O, one end of which is connected with the frame A, and its other end is connected with a short arm, P, attached to the shaft I. To the other end of the shaft I, in such a position that the arms M will not strike it, is attached a lever or arm, Q, so that the shaft I may be operated by hand to move the first mold forward beneath the openings F before the machine is started.

A knife should be attached to the bottom of the tank B to shave off the clay from the top of the molds H as they move forward from beneath the openings F, the forward part of the bottom of the tank B being so formed as not to touch the molds after they leave the said knife.

As the filled molds move out upon the frame G $g'$ they are removed by the off-bearers.

I desire to be understood as laying no claim to the invention of an operative combination of an armed shaft, clay-tank, and automatic levers for discharging the filled molds; but

Having thus described my invention, I claim as new and desire to secure by Letters Patent—

The improved brick-machine herein described, consisting of the tank B F, shaft C E, provided with the pendent arms M attached to bar N, shaft I, arms L, J, and P, spiral spring, stop-piece O, and rollers G, all constructed, arranged, and operating as set forth.

HENRY B. RAMSEY.

Witnesses:
ARED F. WHITE,
H. H. ANDERSON.